United States Patent
Krishnamurthy et al.

(10) Patent No.: US 6,578,113 B2
(45) Date of Patent: *Jun. 10, 2003

(54) METHOD FOR CACHE VALIDATION FOR PROXY CACHES

(75) Inventors: Balachander Krishnamurthy, New York City, NY (US); Craig Ellis Wills, Shrewsbury, MA (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 20 days.

(21) Appl. No.: 09/000,713

(22) Filed: Dec. 30, 1997

(65) Prior Publication Data

US 2003/0061272 A1 Mar. 27, 2003

Related U.S. Application Data

(60) Provisional application No. 60/047,380, filed on Jun. 2, 1997.

(51) Int. Cl.[7] .............................................. G06F 12/00
(52) U.S. Cl. ...................................................... 711/141
(58) Field of Search .................................. 711/118, 119, 711/120, 141; 707/8, 103; 709/101

(56) References Cited

U.S. PATENT DOCUMENTS

| | | | | |
|---|---|---|---|---|
| 5,448,726 A | * | 9/1995 | Cramsie et al. | 707/103 |
| 5,465,359 A | * | 11/1995 | Allen et al. | 709/101 |
| 5,577,251 A | * | 11/1996 | Hamilton et al. | 709/101 |
| 5,581,704 A | * | 12/1996 | Barbara et al. | 711/141 |
| 5,611,049 A | * | 3/1997 | Pitts | 707/8 |

* cited by examiner

Primary Examiner—Matthew Kim
Assistant Examiner—C. P. Chace
(74) Attorney, Agent, or Firm—Kenyon & Kenyon

(57) ABSTRACT

A proxy cache maintains a copy of multiple resources from various servers in a network. When the proxy cache must generate a validation request for at least one resource at one of the servers, the proxy cache piggybacks one or more additional cache validation requests related to documents presently stored in the cache but originating from or associated with the server in question. Upon receipt of an indication of the freshness or validity of the cached copy of the document, the proxy cache can then make a determination as to whether to request an update of the document.

32 Claims, 2 Drawing Sheets

METHOD FOR CACHE VALIDATION FOR PROXY CACHES

RELATED APPLICATIONS

This is a continuation of application number 09/000,713 filed on Dec. 30, 1997 which is a provisional of application number 60,047,380 filed on Jun. 2,1997.

BACKGROUND OF THE INVENTION

The present invention is directed to a method and apparatus for validating resources in a cache memory.

Networks for providing access to data from a plurality of sources are well known. One example of such a network configuration, commonly referred to as the Internet, provides access to a plurality of data sources collectively known as the World Wide Web. The sources can make available many different types of data, that is data that reflects many different types of information such as audio information, video information or text information. In the context of the Internet and the World Wide Web, these data sources are commonly referred to as web sites. A person accessing the network can request a download of data from one or more of the sources or web sites.

An example of such a network is shown in block diagram form in FIG. 1. In particular, a subscriber using a computer device such as a personal computer 101 gains access to the network via a local service provider (LSP) 102 by well known means. The local service provider then provides the subscriber with a connection into the data network, here shown as cloud 103. Within the data network there are a plurality of sources or servers, for example, $s_1$ through $s_3$.

As the subscriber operates within the network she may seek access to a particular source and call for a download of a data resource such as a document or page of information or other type of data. It is well known in the art to provide an intermediate storage mechanism which acts as a cache for resources retrieved from various ones of the servers or web sites. The network could contain a plurality of such caches. In fact, such a cache, referred to as a proxy cache 110 could be associated with the local service provider. The cache is a proxy in that if possible it acts in the place of the server that is the source of a particular resource. For instance, when the subscriber sends a request for accessing or downloading a particular page in the network, say a page residing at source $s_2$, the LSP first checks in the proxy cache to determine whether the requested resource is available from the cache without having to transfer the request through the network to the server which is typically more remote. If the resource is available at the cache, the local service provider can transmit the resource back to the requester without the need of forwarding a request through the network to the server $s_2$. This avoids unnecessary time delay in processing the subscriber's request.

In the context of the Internet and the World Wide Web, a proxy cache is a machine that acts as an intermediary between potentially hundreds of clients and remote web servers by funneling requests from clients to various servers. In the process, the proxy cache is frequently requesting pages to avoid contacting the server repeatedly for the same page.

A problem can arise in keeping track of whether the cached resource, page or document is still current. In one example the cache may associate an expiration time with the stored document. For example, if the stored document related to a daily newspaper generated at a particular time of day each day, a cached copy of the document would be fresh until the next occurrence of the expiration time. Upon receipt of a request for that resource the proxy cache would compare the resource's expiration time and the current time to determine whether the resource is still current or valid. If so the cached resource should be transferred to a requester in lieu of forwarding a request to a data source. Unfortunately, it is very common that the resource that is made available and stored in cache does not have a clear expiration time. It may change in five minutes or it may remain unchanged for a long time.

The prior art has provided two proposals for dealing with expiration time uncertainty.

A first approach is two provide strong cache consistency. This can be done in a number of different ways. For example, the proxy may treat the cached resource as potentially out of date on each access and send a message to the source of the data asking for an updated version of the data only if the data has been modified since the cache last downloaded the resource from the server. A problem with this technique is that it will generate a tremendous amount of messaging traffic of little value, between the cache and the server when a frequently requested resource does not change often. Another technique for providing strong cache consistency places a heavier amount of responsibility on the data sources or servers. In particular, the server would be responsible for keeping track of all of the clients who have earlier asked for downloading of the particular resource. This technique becomes unwieldy for a server when the number of clients is large. In addition, the list of clients can become out of date and as a consequence, the server could waste time and network resources sending invalidation messages to clients who are no longer caching the resource.

In a second approach for dealing with uncertain expiration times weak cache consistency is provided. This approach seeks to minimize the proxy validation and server invalidation messages by using a heuristic or a pre-defined value as an artificial expiration time on a cache resource. Unfortunately, if the protocol or estimation for the value of the artificial expiration time is incorrect then it can leave periods where the cached resource is potentially stale.

It would be beneficial to provide a stronger cache coherency with a reduction in the number of validation request messages and responses that must be sent to maintain that coherency.

SUMMARY OF THE INVENTION

The present invention provides a method and apparatus for improving the operation by which the contents of the cache are validated. In accordance with an embodiment of the present invention when a proxy cache has a reason to communicate with a server with regard to a particular resource, the cache piggybacks a list of one or more of the other resources in the cache that are from the same server for which the expiration time is unknown. Thus, the proxy cache requests validation for the first resource as well as for one or more additional resources which are accessible from the very same server. The server handles the request and indicates which of the cache resources on the list are stale, if any. The proxy can then take appropriate actions to update the cache.

As a result, the proxy cache can be better assured of having more up-to-date information from the various servers with which it has been in communication. It does so without having to generate a validation request very time it receives a request for a particular cached resource. Thus, a stronger cache coherency can be achieved without the overhead cost typically attributable to such coherency.

DETAILED DESCRIPTION

Figures 1, 2:
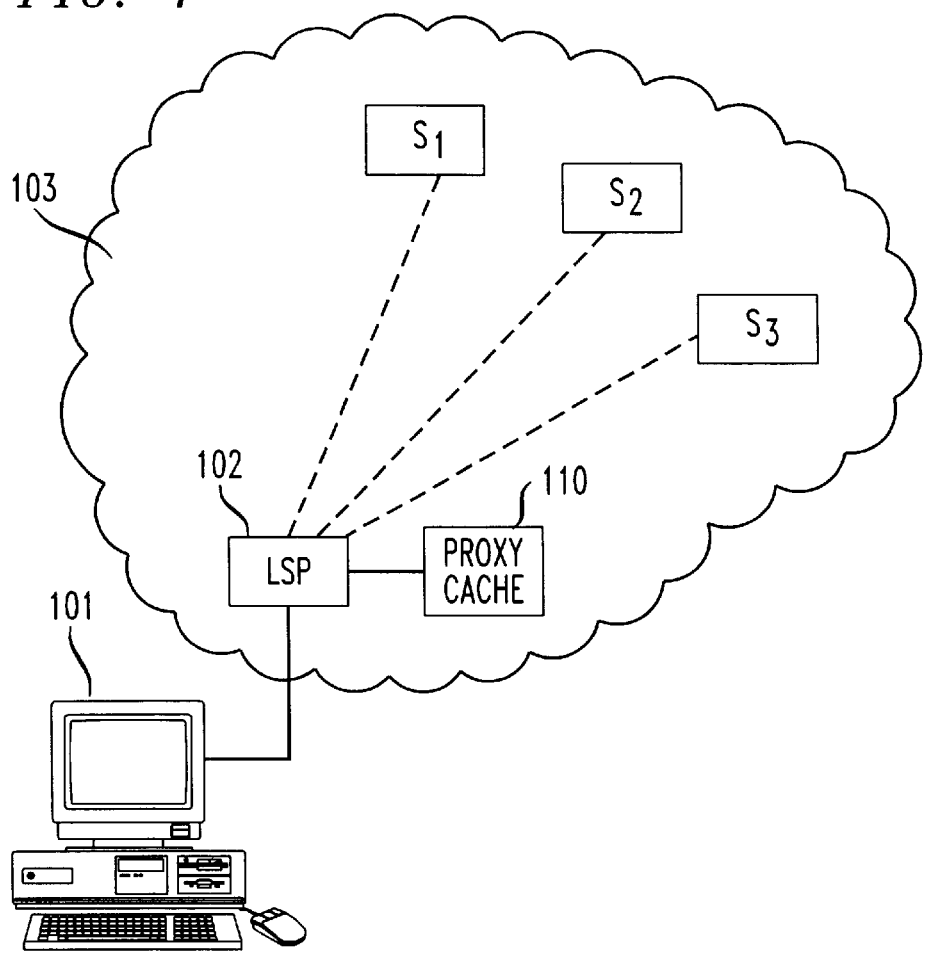
FIG. 1 illustrates a block diagram of a network arrangement in which the present invention can be employed.
FIG. 2 illustrates a block diagram representation of an arrangement of a proxy cache from FIG. 1.

The method and apparatus of the present invention can be employed in the network arrangement that includes a proxy cache, such as that shown in FIG. 1. An example of the contents of a proxy cache are shown in FIG. 2. The cache may contain the resource, for example pages 1, 2 and 3 (201), the source of each respective page, for example $s_1$, $s_2$, or $s_3$ (203) and whether the proxy cache believes that the information is valid or invalid (202). Alternatively, the validity information could take the form of expiration time information.

In accordance with the present invention when the proxy cache receives a request for a particular piece of information, say for example, page 1, it examines whether the cache has a valid copy of the requested resource. If the cache does not have a valid copy then it will forward a request for that resource to the known source of the data, for example server $s_1$. For purposes of discussion this will be referred to as the primary validation request. The proxy cache will also check its contents for other resources which have been downloaded from server $s_1$. The proxy cache then creates a cache validation request referring to any one of these additional resources, or all of them, and piggybacks such a request onto the primary validation request. Thus, when a subscriber requests a resource, such as a web page from a given server, say the proxy cache will then create a validation request relating to other resources contained in the cache that have the same server as their source even though the subscriber has not asked for that particular information. As a result, the proxy cache does not have to remain concerned that it has a specific expiration time associated with the cached data. Instead, it can rely on the fact that multiple resources within the cache, such as documents stored in the cache, will be checked for freshness by requests generated to their respective sources as part of a piggyback request appended to a request generated by a subscriber.

Figure 3:
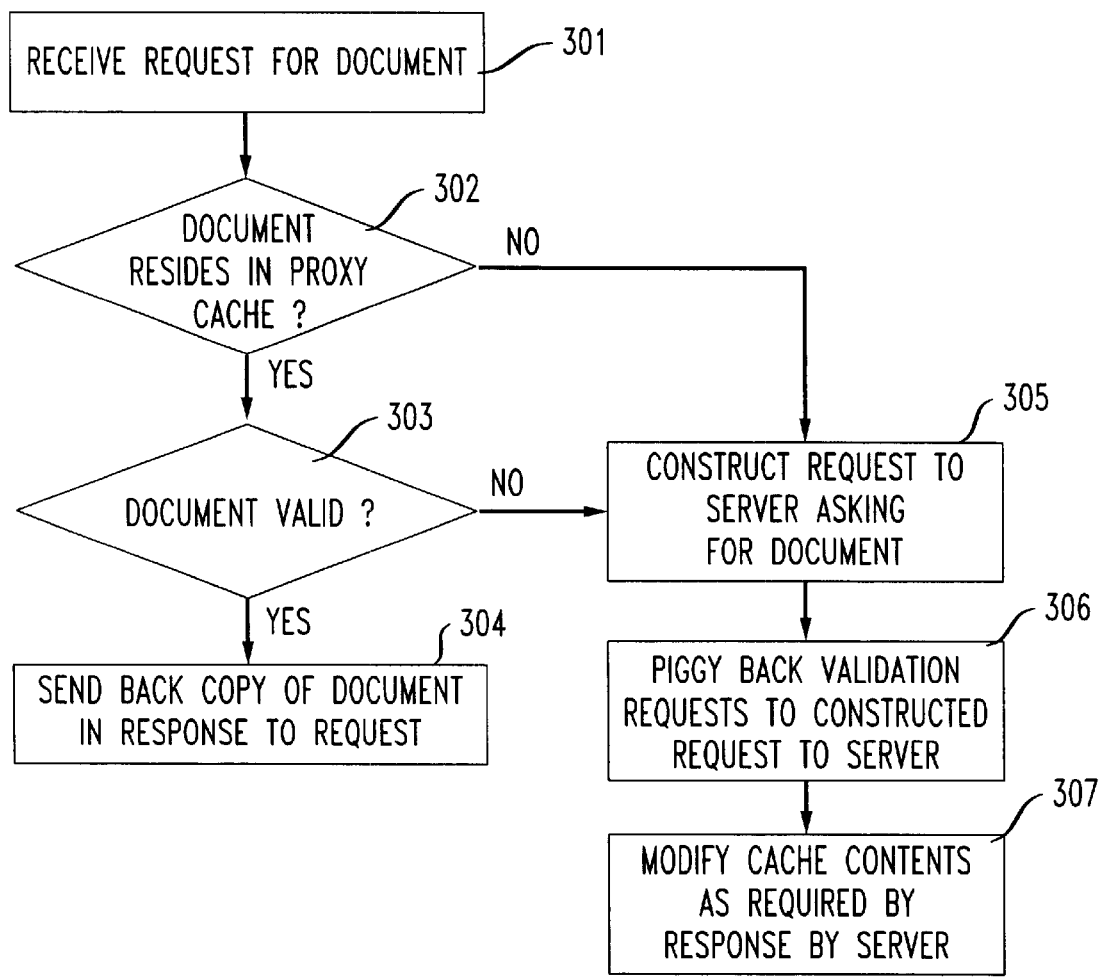
FIG. 3 provides a flow diagram setting forth a method for providing cache validation in accordance with an embodiment of the present invention.

FIG. 3 illustrates a process flow in connection with operating a proxy cache in accordance with an embodiment of the method of the present invention. The proxy cache first receives a request for a particular resource (which could be a page, a document or some other type of data), step 301. The proxy cache determines whether the resource resides within the proxy cache by known methods, step 302. If the resource resides in the proxy cache then the proxy cache determines whether it has an understanding of the validity or freshness of the document as cached, step 303. If the document is valid then a copy of the document is sent back to the subscriber in response to the request, step 304. If, however, in either step 302 or 303 the proxy cache determines that the document does not reside in the cache or that the document may not be valid, the proxy cache then constructs a request to the server which is the source for the document and ask for a copy of the document or whether the cached version is valid, step 305. The proxy cache also identifies other documents or resources residing in the proxy cache which come from the same source as is associated with the requested document. The proxy cache then constructs validation requests for one or more or all of those cached documents associated with the particular server. At step 306, these validation requests are piggybacked on the request to the server asking for the document associated with the request received in step 301. The cache contents are then modified as required by response of the server to the piggyback validation request, step 307. This modification may take the form of changing the cache's contents to indicate that the documents are invalid in the cache thereby causing the cache to automatically call for the resource if a user subsequently requests that resource. Alternatively, the cache may take the invalidity information and generate an update request with respect to those documents which are noted to be invalid, requesting a download of a fresh copy of the document so that the cache will store the most up-to-date version of the document that is available from the document source.

FIG. 4 illustrates a process flow in connection with operating a proxy cache in accordance with another embodiment of the method of the present invention. In this embodiment, the proxy cache receives a request for a data resource, step 401. The proxy cache then determines whether the requested data resource resides in the proxy cache, step 402. If the requested data resource does reside in the proxy cache, the proxy cache then determines the freshness of the requested data resource (i.e., whether the data resource is valid or current), step 403. If the requested data resource is valid, then a copy of the requested data resource is sent to the user, step 404. However, if either the requested data resource does not reside in the proxy cache or the freshness of the requested data resource falls outside a predetermined range (i.e., is invalid), the proxy cache then identifies the source of the requested data resource in step 405 and generates a change-status request related to the requested data resource in step 406. The change-status request, both requests whether the data resource currently residing in the proxy cache is valid and for an updated copy of the resource if needed.

In addition, at step 407, the proxy cache identifies at least one other data resource currently in the proxy cache that also came from the source to be queried. The proxy cache then generates a change-status request related to the other data resource(s) determined to be from the same source, step 408. In step 409, the proxy cache then transmits both the change-status request relating to the data resource and the change-status request relating to the other data resource(s) identified in step 408. In response, the proxy cache receives notices and changes from the source queried, step 410, and modifies the proxy cache accordingly, step 411.

FIG. 5 is an expanded view of step 407 of FIG. 4. As discussed above, step 407 includes, identifying at least one other data resource currently within the proxy cache, step 501, and determining whether the other data resource is valid, step 502. If no other data resources from the source to be queried reside in the proxy cache then the request relating to the data resource is transmitted, step 504. Similarly, if the other data resource(s) is valid, then the request relating to the data resource is transmitted, step 504. If on the other hand, the other data resource(s) is invalid, then the other non-valid data resource is selected, step 503.

FIG. 6 is an expanded view of step 410 of FIG. 4. At step 410, the proxy server receives two different notices and the requested data resource. At step 505, the proxy server receives notice that the other data resource(s) has changed. In addition, at step 506, the proxy cache receives notice that the requested data resource has changed and at step 507, the proxy cache receives a copy of the changed requested data resource.

Another embodiment of the current invention is illustrated in FIG. 7. In step 601 a determination is made as to whether a need for a data resource exists. If the answer is yes, then the data resource is identified, step 602, and the time duration since the most recent updating is determined, step 603. The proxy cache, then determines if the time has been exceeded in step 604. If the time has been exceeded, the proxy cache identifies a plurality of other data resources. in step 605 and queries the source of the needed data resource and the plurality of other data resources regarding whether the needed data resource and the other data resources are valid in step 606.

It is noted that the network shown in FIG. 1 is merely one example of a network in which the present invention might be employed. A proxy cache need not be associated with the local service provider. Instead, the proxy cache may reside elsewhere on the network. Furthermore, the format of the information in the proxy cache as shown by FIG. 2 is merely meant as one example. Alternative formats may be available. The key pieces of information relate to the actual data content itself and an identification of where the cache either received the data content from or must go to assure that the data content is the most up-to-date version of a particular document.

With respect to the process flow described in relation to FIG. 3, the applicants note that the present invention could be achieved in today's data accessing protocol by constructing validation requests constituted by head request messages which will be attached to the request for an update relating the documents specifically requested by a user.

For instance a "Get" message could be sent for the specifically requested update and separate "head request" messages for each additional document of interest could be appended to the Get message. In response to the head request the source returns a header of the identified document and the header indicates when that document was last modified. The proxy cache can then determine whether to ask for an update of any of the additional documents as well. The cache could generate the piggyback validation requests and associate them not only with the request for an update with respect to the initially requested document but alternatively could associate them with a validation request generated by the proxy server concerning the initially requested documents. In yet another alternative, the proxy cache may use some additional parameters to determine which documents stored in the cache should be the subject of piggyback validation requests. For example, the proxy cache may simply select those documents which have resided in the cache and have not been updated for some threshold period of time. Alternatively, the proxy cache could select the "N" oldest document received from a given server and provide piggyback validation requests with regard to those N documents.

In yet another modification the appended validation request could take the form of a new message (for example a piggyback cache validation (PCV) header) the sends information to the source about the documents of interest, such as the last modification on record in the cache. The source, in response to the message, would advise the cache whether it has the most up-to-date version of the document. If not the cache could request transmission of the updated version. Thus, the new PCV message could achieve similar results using a different format while moving a freshness determination from the proxy cache to the source.

The present invention thus provides an improved method and proxy cache for maintaining a proxy with strong cache coherency. It does so while avoiding the need to either complicate the monitoring capabilities of the server and without generating a multitude of validation requests and responses as is known in the prior art.

What is claimed is:

1. A method for maintaining consistency in a cache of a first server in a data communication network, the method comprising the steps of:

receiving a client request for a data resource at the first server;

determining whether the cache holds the requested data resource;

detecting a freshness of the requested data resource if determined to be held by the cache;

when said freshness of said requested data resource falls outside a predetermined range, generating a first change-status request relating to said requested data resource to a source of that requested data resource;

in response to generating said first change-status request, identifying at least one other data resource held by the cache and from said source and generating a second change-status request relating to said at least one other data resource to said source; and sending said first change-status request and said second change-status request in a piggybacked communication to said source.

2. The method of claim 1 comprising the further step of receiving notice from said source that said at least one other data resource has changed.

3. The method of claim 1 comprising the further steps of:

receiving a notice from said source that said requested data resource has changed;

receiving the changed requested data resource from said source; and receiving notice from said source that said at least one other data resource has changed.

4. The method of claim 2 comprising the further step of:

rendering said at least one other data resource in said cache invalid in response to said notice that said at least one other data resource has changed.

5. The method of claim 2 comprising the further step of:

requesting a transmission of the changed said at least one other data resource from said source.

6. The method of claim 1 wherein said step of identifying said at least one other data resource comprises the substeps of:

detecting all data resources in said cache identified as being from said source of the requested data resource;

examining a freshness of each of the detected data resources; and selecting a subset of the detected data resources based on the examination of freshness;

wherein said subset corresponds to the identified at least one other data resource.

7. In a data communication system including a plurality of servers and a proxy server that includes a proxy cache, a method for maintaining cache consistency comprising the steps of:

receiving a request from a client for a data resource at said proxy server;

determining whether said proxy cache holds the requested data resource;

identifying a source of said requested data resource;

in response to the identification of the source of the request data resource, identifying other data resources from said source in said proxy cache;

selecting a subset of the identified other data resources;

requesting, from said source, information regarding the requested data resource and the subset of identified other data resources in a unitary communication.

8. The method of claim 7 wherein said step of requesting comprises:

generating a first change-status request identifying said requested data resource; and in response to said first change-status request, generating a second change-status request identifying said subset of identified other data resources.

9. The method of claim 7 comprising the further step of rendering invalid each one of the subset of identified other data resources that is indicated to have changed.

10. The method of claim 7 comprising the further step of re-loading each one of the subset of identified other data resources that is indicated to have changed.

11. The method of claim 7, comprising the further step of receiving information regarding differences between a version of one of the subset of identified other data resources in the cache and a version of said one of the subset of identified other data resources at the source.

12. The method of claim 7 comprising the further step of updating a freshness of each data resource in said subset of identified other data resources that is indicated to be unchanged.

13. A method for checking the validity of contents of a cache memory in a data network, the method comprising the steps of:

detecting a need to verify at a source a data resource requested of the cache memory;

in response to said need, identifying a plurality of other data resources stored in the cache memory and associated with the source; and querying the source with a unitary request for information regarding said data resource and to determine if any of said plurality of other data resources have changed since the most recent previous query.

14. The method of claim 13, wherein in response to an indication that one or more data resources have changed the method further comprises the step of:

re-loading any data resource indicated to have changed.

15. The method of claim 14 wherein said step of detecting a need to verify comprises the substeps of:

identifying a data resource of interest in the cache memory;

detecting a time duration identifying the time since a most recent re-loading of the data resource;

determining a need to verify when the detected time duration exceeds a predetermined value.

16. A method for maintaining consistency in a cache in a data communication network, the method comprising the steps of:

receiving a request for a data resource from a client;

determining whether the cache holds a fresh copy of the requested data resource;

when it is determined that the cache does not hold a fresh copy of the requested data resource, transmitting a first request relating to said requested data resource to a source of that requested data resource; and in response to the determination that the cache does not hold a fresh copy of the requested data resource transmitting a second change status request relating to at least one other data resource from said source held by the cache, piggybacked with said first request.

17. The method of claim 16 comprising the further step of receiving notice that said at least one other data source has changed.

18. A method for maintaining cache coherency, comprising:

receiving a data resource request from a client at a first server;

identifying whether said data resource is held by a cache of the first server;

checking the validity of said data resource in the first server;

if said data resource is held by the cache and is invalid, sending a primary request to a second server for an updated version of said data resource;

sending a supplemental request piggybacked with said primary request, to the second server, to update at least one additional data resource held in the cache; and delivering the updated version of said requested data resource to the client.

19. The method of claim 18, further comprising, identifying at least one additional data resource prior to sending the primary and supplemental requests.

20. The method of claim 18, wherein checking the validity of said data resource includes detecting a freshness value.

21. The method of claim 18, further comprising receiving an updated requested data resource and a notice of whether the at least one additional data resource has changed.

22. The method of claim 21, wherein receiving the updated requested data resource includes receiving a notice from the second server that the requested data resource has changed.

23. The method of claim 21, further comprising invalidating said at least one additional data resource in response to the notice of whether the at least one additional data resource had changed.

24. The method of claim 21, further comprising requesting a changed copy of said at least one additional data resource from said second server.

25. A cache coherency method, comprising:

responsive to a first request for an addressed data item, determining whether a local cache stores the data item, if so, determining whether a state of the data item is valid, if the state is not valid, retrieving from the cache a source identifier associated with the data item, identifying another data item stored in the cache having the same source identifier associated therewith, and transmitting a cache validation request to a server associated with the source identifier, the cache validation request identifying the two data items, and following a response to the cache validation request, furnishing the addressed data item in response to the first request.

26. The cache coherency method of claim 25, further comprising, if the response to the cache validation request indicates that the addressed data item has been updated at the server:

transmitting a request to the server requesting a copy of the data item, wherein the furnishing of the addressed data item is made from a copy of the data item received from the server.

27. The cache coherency method of claim 25, wherein:

the response to the cache validation request includes a copy of the addressed data item, and the furnishing is made from the received copy.

28. The cache coherency method of claim 25, wherein, if the response to the cache validation request indicates that the addressed data item has not been updated at the server, the furnishing of the addressed data item is made from the locally stored copy of the data item.

29. The cache coherency method of claim 25, wherein:

the cache validation request includes a primary validation request identifying the addressed data item and a secondary validation request identifying the other data item, and the local cache marks a state identifier of the other data item as invalid upon receipt of a response to the secondary validation request indicating the other data item has been updated.

30. A cache coherency method, comprising:

receiving from a client terminal, a request for a data item, determining whether a local cache stores the requested data item and, if so, whether the requested data item is fresh, when the freshness of the data item falls outside a predetermined range, retrieving a source identifier associated with the data item, identifying a second stored data item associated with the source identifier, and transmitting a unitary cache validation request to a server associated with the source identifier, the request identifying the first and second data items.

31. The cache coherency method of claim 30, further comprising: furnishing the requested data item to the client terminal.

32. A cache coherency method, comprising:

responsive to a first request for an addressed data item, determining whether a local cache stores the data item, if so, determining whether a state of the data item is valid, if the state is not valid, retrieving from the cache a source identifier associated with the data item, identifying all other data items stored in the cache having the same source identifier associated therewith, and transmitting a cache validation request to a server associated with the source identifier, the cache validation request identifying the two data items, and upon receipt of a response from the server, changing to invalid the state of all data items identified by the server as having been updated.

* * * * *